United States Patent [19]
Crosson

[11] Patent Number: 6,161,806
[45] Date of Patent: *Dec. 19, 2000

[54] APPARATUS AND METHOD FOR REDUCING REPETITIVE STRESS INJURY

[75] Inventor: Robert J. Crosson, New Brighton, Minn.

[73] Assignee: Idea Development, Engineering and Service, Inc., Minneapolis, Minn.

[ * ] Notice: This patent is subject to a terminal disclaimer.

[21] Appl. No.: 08/798,185

[22] Filed: Jan. 17, 1997

Related U.S. Application Data

[63] Continuation of application No. 08/376,584, Jan. 23, 1995, abandoned.

[51] Int. Cl.$^7$ ................................................. F16M 11/24
[52] U.S. Cl. .................. 248/118.3; 248/371; 248/349.1; 108/139
[58] Field of Search ................................ 248/919, 921, 248/923, 678, 118.3, 188.2, 178.1, 179.1, 186.1, 186.2, 677, 128.7, 346.03, 346.04, 346.07, 349.1, 346.05, 412, 371, 393, 395, 396, 398; 108/1, 20, 22, 139, 141; 384/617; 52/167.5, 167.4

[56] References Cited

U.S. PATENT DOCUMENTS

| | | | |
|---|---|---|---|
| 1,135,155 | 4/1915 | Blundell | 248/118.3 |
| 2,828,589 | 4/1958 | Hercik | 52/167.5 X |
| 2,890,010 | 6/1959 | Barkheimer | 248/919 X |
| 2,895,770 | 7/1959 | Matthews | 384/617 |
| 3,615,068 | 10/1971 | Edelstein | 248/349.1 |
| 3,813,491 | 5/1974 | Pennar | 248/919 X |
| 4,132,455 | 1/1979 | Binoth | 312/97.1 |
| 4,276,786 | 7/1981 | Longenstein | 384/141 X |
| 4,305,563 | 12/1981 | Presson | 248/349 |
| 4,365,561 | 12/1982 | Tellier et al. | 108/7 |
| 4,372,621 | 2/1983 | Farrant | 384/125 X |
| 4,441,432 | 4/1984 | Carlton | 108/139 X |
| 4,555,990 | 12/1985 | Egawa | 248/349.1 |
| 4,621,782 | 11/1986 | Carlson et al. | 248/183 |
| 4,662,265 | 5/1987 | Becker et al. | 248/179.1 X |
| 4,687,167 | 8/1987 | Skalka et al. | 248/919 X |
| 4,776,284 | 10/1988 | McIntosh | 108/138 |
| 4,819,002 | 4/1989 | Reboullet | 248/179.1 X |
| 4,958,790 | 9/1990 | Nix et al. | 248/74.3 X |
| 4,965,425 | 10/1990 | Towsend | 219/10.55 |
| 4,969,290 | 11/1990 | Skoretz | 248/349.1 |
| 5,058,840 | 10/1991 | Moss et al. | 248/118.5 |
| 5,079,789 | 1/1992 | Jandrakovic | 248/349.1 X |
| 5,098,053 | 3/1992 | Cotterill | 248/281.1 |
| 5,102,084 | 4/1992 | Park | 248/286 |
| 5,174,224 | 12/1992 | Nagy et al. | 108/114 |
| 5,219,136 | 6/1993 | Hassel et al. | 248/118 |
| 5,261,200 | 11/1993 | Sasaki et al. | 52/167.5 |
| 5,329,825 | 7/1994 | Askins | 74/89.15 |
| 5,564,844 | 10/1996 | Patterson, Jr. et al. | 400/492 |
| 5,657,956 | 8/1997 | Smith et al. | 248/371 |

OTHER PUBLICATIONS

Article, "Constant Key Motion Rist Rocker", *PC Magazine*, p. 129 (Apr. 21, 1998).
Star Tribune, Sunday, Jan. 15, 1995, pp. 1 and 14A.

*Primary Examiner*—Leslie A. Braun
*Assistant Examiner*—Gwendolyn Baxter
*Attorney, Agent, or Firm*—Merchant, Gould, Smith, Edell, Welter & Schmidt, P.A.

[57] ABSTRACT

An apparatus includes a support surface and a moving mechanism for automatically varying the orientation of the support surface in a predetermined manner over time to reduce or eliminate the likelihood of repetitive stress injury as a result of performing repetitive tasks on or otherwise using the support surface. By varying the orientation of the support surface, e.g., by moving and/or rotating the support surface over time, repetitive tasks performed on the support surface are modified at least subtly to reduce the repetitiveness of the individual motions performed by an operator.

21 Claims, 4 Drawing Sheets

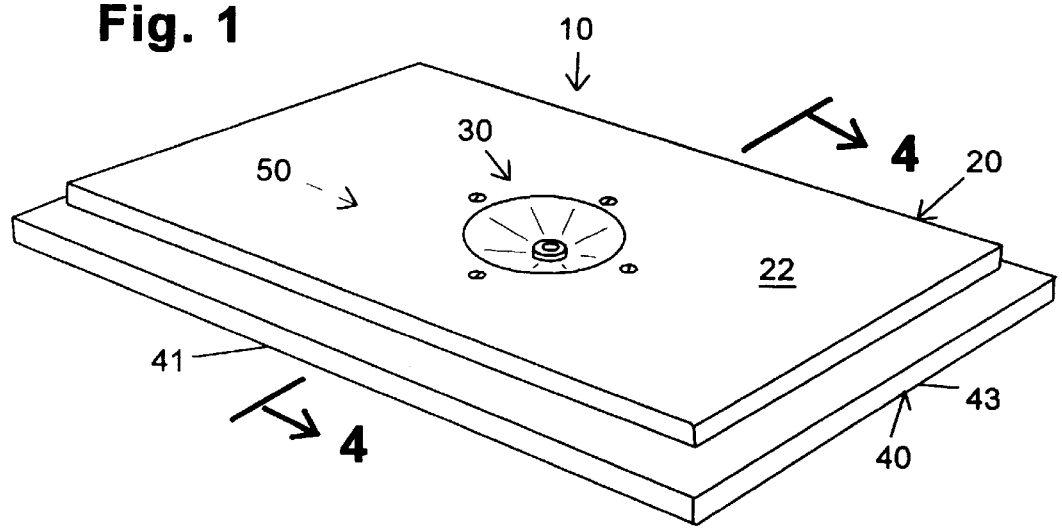
Fig. 1
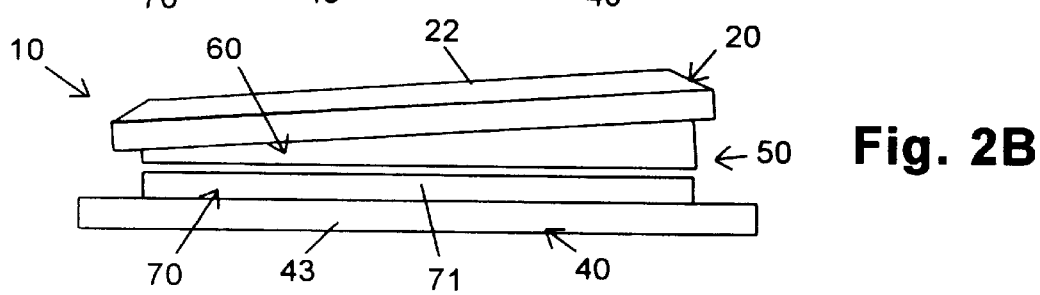
Fig. 2A
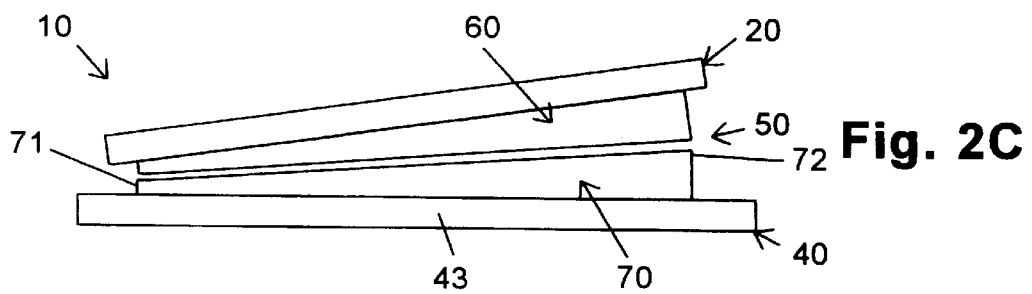
Fig. 2B
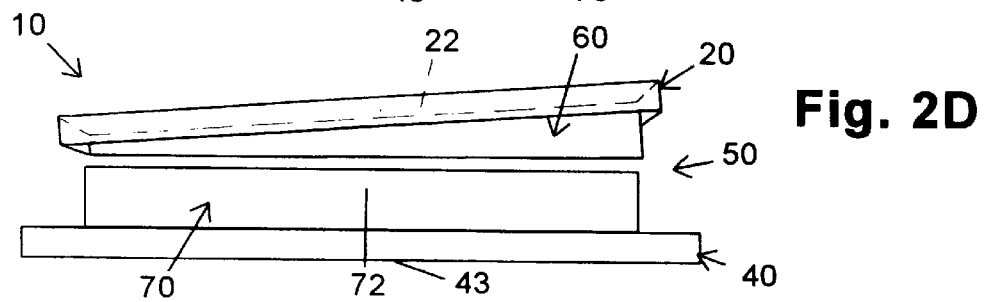
Fig. 2C
Fig. 2D

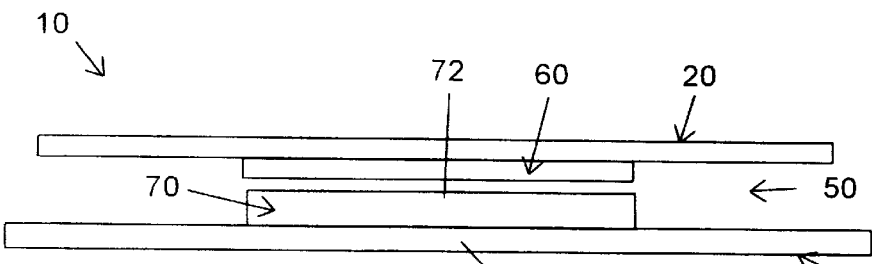
Fig. 3A
Fig. 3B
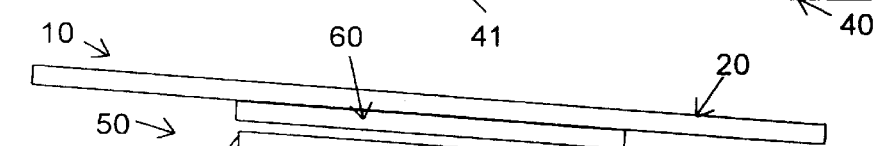
Fig. 3C
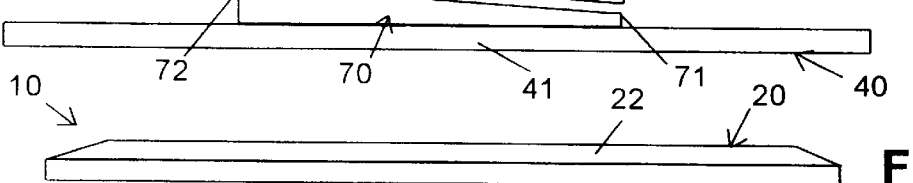
Fig. 3D
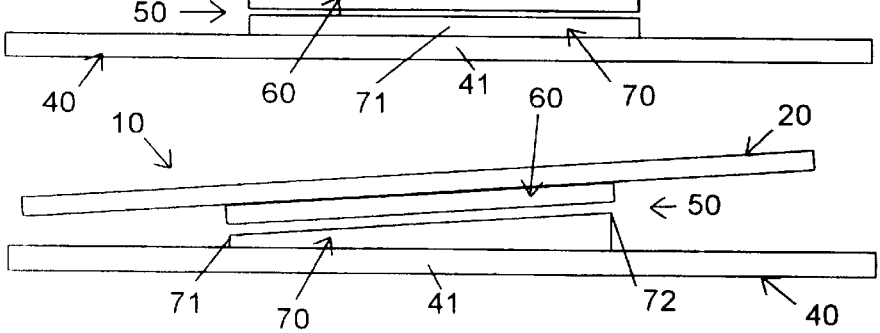
Fig. 4

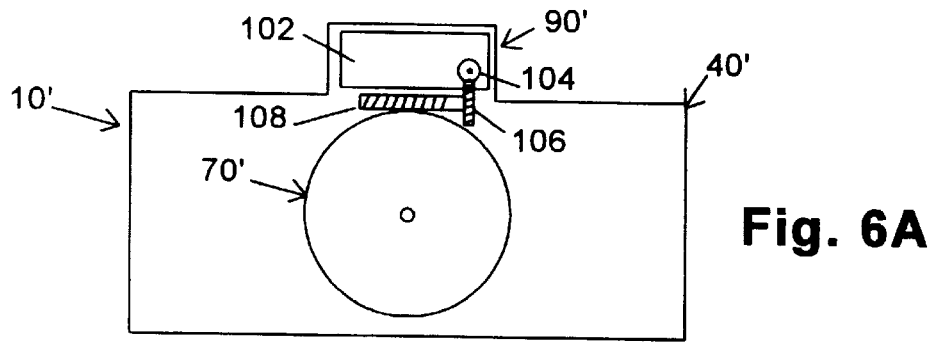
Fig. 6A
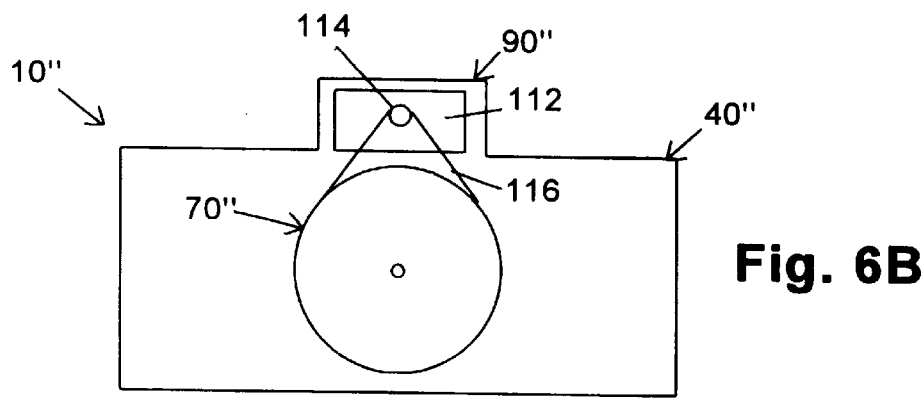
Fig. 6B
Fig. 7
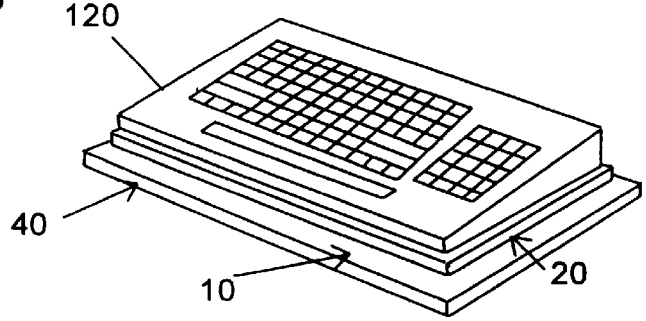
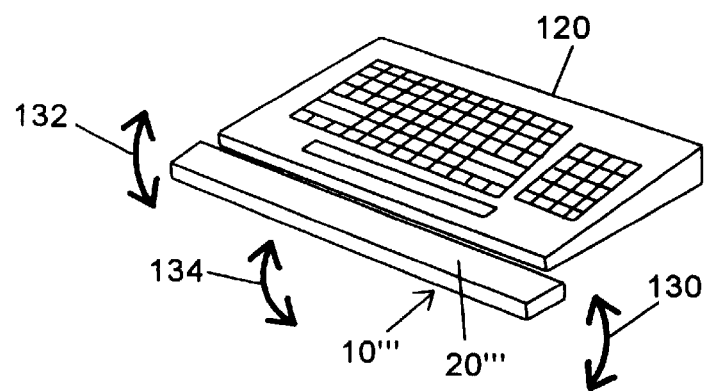
Fig. 8

APPARATUS AND METHOD FOR REDUCING REPETITIVE STRESS INJURY

This is a Continuation of application Ser. No. 08/376,584, filed Jan. 23, 1995 now abandoned.

FIELD OF THE INVENTION

The invention is directed to an apparatus having a support surface, and a method of operation therefor, for performing a variety of tasks. More particularly, the invention is directed to an apparatus and method of operation therefor used for the prevention of repetitive stress injuries and the like.

BACKGROUND OF THE INVENTION

Repetitive stress injuries (RSI) are believed to result from repetitive motions which strain or injure a part of the body due to the repetitive nature of the motions. One common repetitive stress injury is carpal tunnel syndrome, which may cause pain and numbness in the hands and wrists due to swelling of the tendons. Carpal tunnel syndrome is believed to be a result of repetitive movements in the wrist and hand, e.g., as a result of data entry with a keyboard. Data entry operators, secretaries, sales checkout clerks, and others who use keyboards for extended periods of time may be at risk for carpal tunnel syndrome.

Further, some industrial tasks, such as assembly line and meat packing work, may involve repetitive tasks that can cause RSI. Over the road truck drivers, who spend hours driving with the arms and hands in the same position, may also be susceptible to RSI. In general, any occupation or activity that involves the repetitive performance of a task may give rise to RSI.

The frequency of RSI has increased, often resulting in debilitating injuries and workers compensation claims, as well as a number of lawsuits filed against employers and manufacturers of suspect products such as keyboards. Therefore, a significant amount of study has begun to determine the precise causes of RSI and how to prevent it.

To date, several proposed solutions for preventing RSI have been the use of supports or pads, e.g., wrist pads commonly used with keyboards, or the use of braces, e.g. wrist braces, to prevent the movement of joints. Experts also suggest taking breaks and stretching to break up repetitive tasks. However, it is inconclusive at this time whether any of the pads, supports, or braces have reduced the frequency of RSI, and efforts to encourage workers to take breaks and stretch may not be particularly successful since the workers themselves must take the necessary steps to prevent RSI.

Therefore, a need exists for a method of reducing or preventing the occurrence of repetitive stress injury and the like, preferably without requiring any special effort on the part of an operator or worker. There also exists a need for an apparatus for implementing the method for reducing RSI.

SUMMARY OF THE INVENTION

The invention addresses these and other problems associated with the prior art in providing an apparatus, and method of operation therefor, in which the orientation of a support surface relative to an operator is automatically varied. By varying the orientation of the support surface, e.g., by moving and/or rotating the support surface over time, repetitive tasks performed on the support surface are modified at least subtly to reduce the repetitiveness of the individual motions performed by an operator, and thereby reduce or eliminate the likelihood of RSI. Furthermore, the movements of the support surface are preferably subtle enough such that the movements are barely, if at all, perceptible to an operator.

Therefore, according to one aspect of the invention, an apparatus is provided for reducing repetitive stress injury. The apparatus includes a support surface from which an operator performs a repetitive task, and means for automatically varying the orientation of the support surface relative to the operator in a predetermined manner over time.

According to another aspect of the invention, a keyboard support is provided, which includes a base; a first wedge rotatably coupled to the base, the first wedge including a plurality of teeth disposed about its periphery and an inclined surface; a second wedge having an inclined surface engaging the inclined surface of the first wedge; a support surface, coupled to the second wedge and secured to the base by a flexible boot respectively secured to the support surface and the base, the support surface adapted to receive a keyboard; and moving means for rotating the first wedge relative to the second wedge, the moving means including a worm gear engaging the teeth on the first wedge and an electric motor for driving the worm gear.

According to a further aspect of the invention, a method is provided for reducing repetitive stress injury resulting from a repetitive task performed by an operator, which includes the step of automatically varying the spatial relationship between an operator and a workpiece in a predetermined manner over time, and while the operator performs the repetitive task.

These and other advantages and features, which characterize the invention, are set forth in the claims annexed hereto and forming a further part thereof. However, for a better understanding of the invention, and the objectives and advantages attained therefrom, reference should be made to the Drawing, and to the accompanying descriptive matter, in which there is described a preferred embodiment of the invention.

BRIEF DESCRIPTION OF THE DRAWING

FIG. 1 is a perspective view of a preferred apparatus consistent with the invention.

FIGS. 2A–2D are functional side elevational views of the apparatus of FIG. 1, illustrating the movement of a support surface thereon at 0°, 90°, 180° and 270° of rotation, respectively, of a moving mechanism.

FIGS. 3A–3D are functional front elevational views of the apparatus of FIG. 1, illustrating the movement of the support surface thereon at 0°, 90°, 180° and 270° of rotation, respectively, of the moving mechanism.

FIG. 4 is a cross-sectional view of the apparatus of FIG. 1, taken through lines 4—4.

FIGS. 6A and 6B are functional top plan views of two alternate moving mechanisms suitable for use with the apparatus of FIG. 1.

FIG. 7 is a perspective view of an alternate keyboard stand application consistent with the invention, shown with a keyboard supported thereon.

FIG. 8 is a perspective view of an alternate wrist pad application consistent with the invention, shown in operating position in front of a keyboard.

DETAILED DESCRIPTION OF THE PREFERRED EMBODIMENTS

Figure 5:
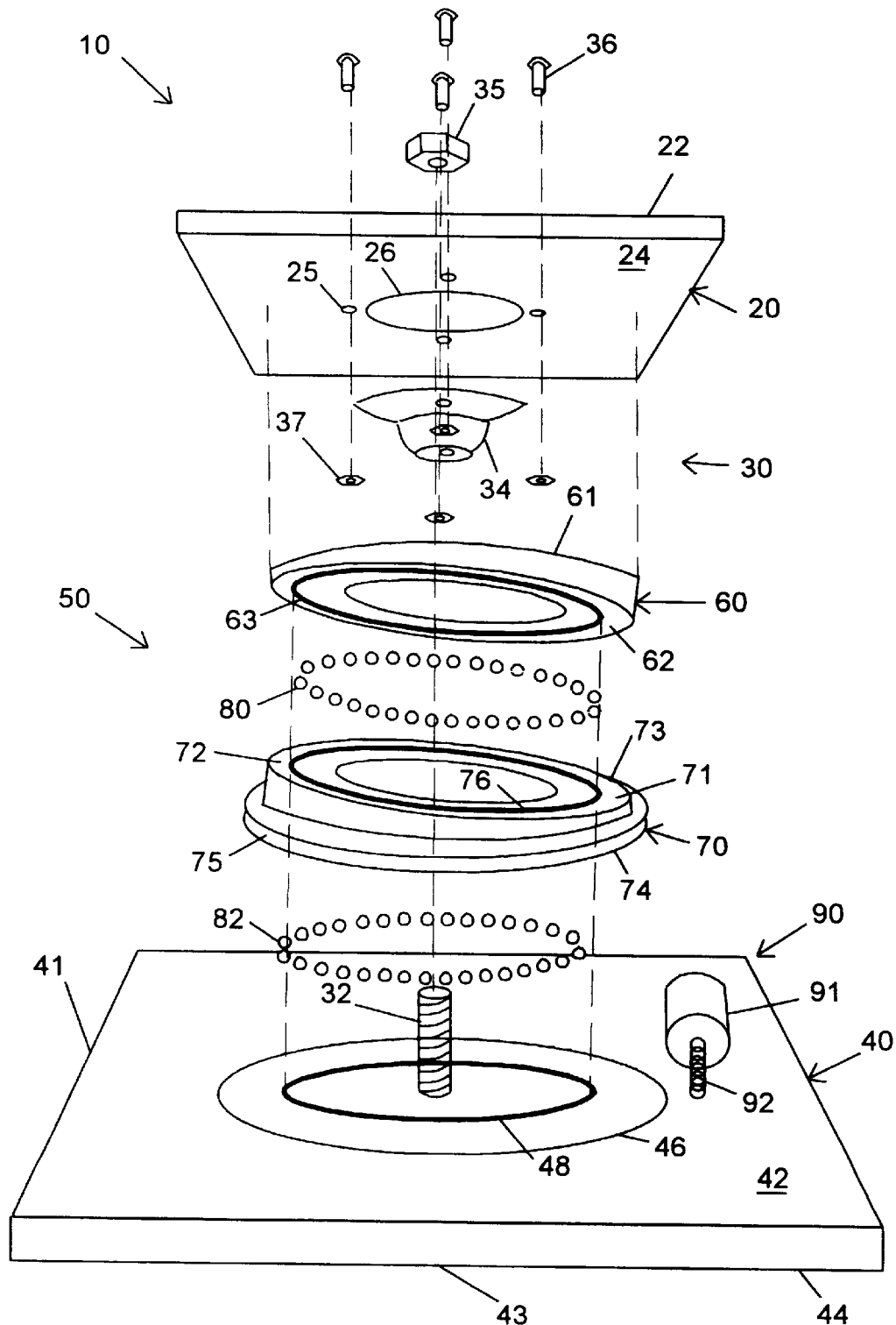
FIG. 5 is an exploded perspective view of the apparatus of FIG. 1.

Turning to the Drawing, wherein like numbers denote like parts throughout the several views, FIG. 1 shows a preferred apparatus 10 consistent with the invention. Apparatus 10 generally includes a support surface 20, supported on a base 40 (having a front edge 41 and a right side edge 43), secured thereto by a securing mechanism 30, and being movable by a moving mechanism generally designated at 50.

Support surface 20 includes a top surface 22 which may be used to support any number of objects which are generally defined as "workpieces", and which may vary depending upon the particular environment in which apparatus 10 is being used. For example, one preferred environment in which apparatus 10 may be employed is as a keyboard stand (best seen in FIG. 7 where apparatus 10 is illustrated as supporting a keyboard 120), whereby the workpiece is a keyboard, such as for a computer, a cash register, a typewriter, a calculator, a stenography machine, or other data entry device. Further, if the keyboard is integral with the device in which it is used, e.g., in the case of most cash registers and typewriters, support surface 20 may also support the entire device. Moreover, the support surface may form a portion of the keyboard or data entry device (e.g., the support surface itself may be the bottom member of the keyboard housing). Apparatus 10 may therefore be particularly useful for those in occupations such as word processing, data entry, telephone operators, secretarial, retail checkout, court reporting, etc., where a keyboard or other user input device is used frequently by an operator.

In other environments, support surface 20 may be used to support other types of workpieces. For example, on an assembly line, the support surface may support parts which are assembled or otherwise operated upon by an operator. In meat packing and other food processing applications, the support surface may support food products which are being sorted, cut, or otherwise processed by an operator. In packaging applications, the support surface may support products to be packaged and the packaging material used therefor.

In addition, support surface 20 may be used to support a part of an operator's body in lieu of or in addition to a workpiece. For example, in a wrist pad/support application (e.g., as shown in FIG. 8 as apparatus 10''' generally positioned in front of keyboard 120), the support surface 20''' may support an operator's wrists, whereby movement of the support surface varies an operator's position such that repetitive motions are varied at least slightly by the movement of the surface. In other environments, the support surface may support other parts of an operator's body (e.g., arms, legs, torso). For example, a support surface may be used as an arm rest to support the elbows of a vehicle driver to change the position of the driver's arms while he or she is operating a vehicle.

In general, the principles of the invention include automatically varying over time the spatial relationship between an operator and a workpiece upon or with which the operator is performing a repetitive task. Therefore, the individual motions of an operator's body while performing a repetitive task are varied at least subtly over time to reduce the likelihood of injury due to the repetitive nature of the task.

Consequently, it will be appreciated by one skilled in the art that the invention is not limited by the particular applications or environments disclosed herein. Instead, preferred embodiments of the invention are used to vary the spatial relationship between an operator and a workpiece in any instance where an operator is performing a repetitive task on or with the workpiece which may cause repetitive stress injury, either by varying the orientation of the workpiece relative to the operator, or by varying the orientation of a part of the operator's body which is supported by a surface while performing the task. To this extent, the size, shape, contour, etc. of the support surface may vary consistent with the application or environment of use. The support surface may be formed of different materials, and may even include padding (e.g., where the support surface supports a body part). In addition, the support surface may form an integral part of the workpiece itself.

As discussed above, a moving mechanism (designated 50 in FIG. 1) is preferably used to automatically vary the orientation of the support surface in a predetermined manner over time. By "varying the orientation", what is meant is a spatial movement of at least a portion of the support surface, either through pivoting, rotating, displacing, or other movement of the support surface.

By "automatically", what is meant is a controlled movement which occurs without requiring any specific operator intervention or control when the moving mechanism has been activated. Of course, specific aspects of the moving mechanism may be controlled by an operator, e.g., to change the type or speed of movement, or to turn the mechanism on or off. However, once set by an operator, the preferred apparatus preferably operates substantially independently of operator control to enable the operator to focus on the particular tasks at hand.

By "predetermined manner over time", what is meant is movement which follows a predetermined profile, either operating continuously or discretely (e.g., pulsed on and off periodically). The profile may by periodic (i.e., repeating), or more than one profile may be used depending upon user preference or other concerns. In the preferred embodiment such a profile is not random in nature. However, it will be appreciated that programming could be developed to randomize movement of a support surface within the scope of the invention.

Moving mechanism 50 may take any configuration suitable for varying the orientation of the support surface in the desired predetermined manner. For example, FIGS. 2A–2D and 3A–3D illustrate one predetermined profile of movement for support surface 20 on apparatus 10. FIGS. 2A–2D show a side elevational view of apparatus 10 (i.e., looking at right edge 43 of base 40). FIGS. 3A–3D show a front elevational view of apparatus 10 (i.e., looking at front edge 41 of base 40).

In this embodiment, moving mechanism 50 includes a pair of wedges 60 and 70 which mate along cooperatively inclined surfaces. First wedge 70 is preferably rotatable with respect to the base and second wedge 60. Second wedge 60 is preferably secured to support surface 20 such that wedge 60 remains stationary with respect to the support surface and the base of apparatus 10. Wedges 60 and 70 may be formed, for example, from a right cylinder object by cutting the cylinder into two parts through a non-orthogonal plane to form a pair of wedges having cooperatively and matched inclined mating surfaces. By forming planar inclined surfaces on the wedges, their respective rotation will permit the inclined surface on the second wedge to follow the profile of the inclined surface on the first wedge.

As an example, in the position shown in FIGS. 2A and 3A, first wedge 70 is shown having an inclined surface with a first, low point 71 (representing the point of minimum thickness for the wedge) and a second, high point 72 (representing the point of maximum thickness for the wedge). From FIGS. 2A and 3A, it may be seen that the support surface 20 is in a substantially neutral orientation. This position is designated the starting position (i.e., 0° of rotation) for ease of illustration.

Moving mechanism 50 in this example preferably rotates first wedge 70 in a clockwise direction, while second wedge 60 and support surface 20 do not rotate. FIGS. 2B and 3B show a one quarter turn rotation of first wedge 70 (the 90° position), whereby low point 71 is at the center of the view. In this position, working surface 20 is inclined to the left (i.e., the left side is raised and the right side is lowered), when viewed from the front.

FIGS. 2C and 3C show a further quarter turn rotation of first wedge 70 (the 180° position), whereby low point 71 is now at the front of apparatus 10, and high point 72 is at the rear. In this position, working surface 20 is inclined to the rear (i.e., the rear is raised and the front is lowered), when viewed from the front.

FIGS. 2D and 3D show a further quarter turn rotation of first wedge 70 (the 270° position), whereby high point 72 is at the center of the view. In this position, working surface 20 is inclined to the right (i.e., the right side is raised and the left side is lowered), when viewed from the front. An additional quarter turn rotation of wedge 70 will return support surface 20 to the starting orientation shown in FIGS. 2A and 3A.

The relative shapes of wedges 60 and 70 may be varied to achieve any desired orientation of support surface 20. In the preferred apparatus 10, the inclined surfaces are each inclined about 10°, and the opposing surfaces which mate with the base and the support surface are orthogonal to the outer walls of the wedge. This arrangement provides a position (e.g., as shown in FIGS. 2A and 3A) where the support surface is neutral. However, it will be appreciated that the different surfaces on the wedges may be selected individually to provide any range of inclinations for the support surface. Moreover, only one wedge may be used if desired, resulting in an incline of the support surface in all directions through the revolution of the wedge.

The preferred construction of apparatus 10 is shown in greater detail in FIGS. 4 and 5. The primary components of apparatus 10 are support surface 20, securing mechanism 30, base 40, and moving mechanism 50 including first wedge 70, second wedge 60, and drive mechanism 90.

Support surface 20 includes a top surface 22 and a bottom surface 24, with a central aperture 26. Support surface 20 may take any contour or shape to perform its suited function for a particular application, and may even form an integral part of a workpiece (e.g., built into a keyboard). Additional components, such as a non-stick or decorative covering, may also be disposed on support surface 20. Further, support surface 20 may be the top surface of wedge 60, whereby a separate platform may be supported thereby.

Base 40 includes a top surface 42, a bottom surface 44, a front edge 41 and a right side edge 43. Base 40 may also take any contour or shape to perform its desired function for a particular application.

Support surface 20 is secured to base 40 through a securing mechanism 30 which includes a flexible boot 34 secured at one end to the support surface, e.g., with bolts 36 projecting through apertures 25, and nuts 37. The other end of the boot is secured to base 40, e.g., to threaded bolt 32 and nut 35, which is preferably a compression or similar type of locking fastener. Boot 34 is preferably made of rubber or another flexible material, whereby boot 34 prevents support surface 20 from rotating relative to base 40, while still enabling portions of the support surface to raise or lower as wedge 70 rotates. Other securing mechanisms which can secure one member to another while permitting some degree of relative pivoting or movement may also be used in the alternative.

Moving mechanism 50 is interposed between support surface 20 and base 40. First wedge 70 includes a first surface 74 facing base 40 and a second surface 73 facing wedge 60 and support surface 20. A low point on second surface 73 is designated 71 and a high point is designated 72. As discussed above, the second surface is inclined relative to the first surface. Second wedge 60 includes a first surface 61 and a second surface 62 which are preferably matched in inclination to first and second surfaces 74, 73 of wedge 70, such that a neutral orientation may be obtained for support surface 20. Moreover, wedge 60 is preferably fixedly secured to bottom surface 24 of support surface 20, e.g., by fasteners or adhesives.

To permit first wedge 70 to rotate relative to base 40 and second wedge 60, a bearing arrangement is provided to provide relatively frictionless rotation of the wedge, even when support surface 20 is subjected to downward forces, e.g., when heavy objects are placed on the surface. Many different rotational bearing arrangements are known in the art, as well as different types of lubricating systems. In the preferred embodiment, a plurality of ball bearings 80 are received in channels 63 and 76 on wedges 60 and 70, respectively, to permit rotation relative to wedge 60, and a plurality of ball bearings 82 are received in channel 48 on base 40 and a corresponding channel on first surface 74 of wedge 70 (not shown in FIG. 5).

As discussed above, securing mechanism 30 secures support surface 20 to base 40. The fixed relationship of wedge 60 to support surface 20 may be sufficient to maintain both wedges centered with respect to one another. Alternatively, a recess 46 may be provided in base 40 to center wedge 70. Further, the wedges may be disc shaped, with a central aperture for receiving bolt 32, to maintain the wedges in their proper positions. Other mechanisms for rotatably retaining the wedges may also be used. In addition, second wedge 60 may rotate instead of wedge 70.

Moving mechanism 50 also includes a drive mechanism, generally designated 90, for rotating wedge 70 to provide the necessary motion for varying the orientation of support surface 20. In the preferred embodiment, drive mechanism 90 includes a worm gear 92 driven by an electric motor 91. A plurality of teeth 75 are disposed around the periphery of wedge 70 to engage the worm gear such that a rotation of motor 91 will induce a rotation of wedge 70. The teeth 74 may be provided on wedge 70, or may be disposed on another member mounted thereto to rotate with the wedge.

Drive mechanism 90 preferably operates continuously and at a rate which causes the movement of support surface 20 to be imperceptible (or barely perceptible) to an operator such that the operator will generally not be aware of the movement of the surface (generally on the order of several minutes or even an hour for each revolution). However, it will be appreciated that a drive mechanism may be used which operates discretely, for example, by pulsing on and off at discrete intervals. Further, the drive mechanism may operate at such a rate that an operator notices the movement of the support surface.

Drive mechanism 90 may be powered by batteries or line current, and may include an on/off switch. Speed control may be provided, as well as a control system for selecting different profiles.

It will be appreciated that the preferred worm gear drive mechanism will rotate wedge 70 at a substantially reduced rate from that of motor 91. However, it may be desirable to further reduce the gear ratio between the wedge and motor, e.g., through a plurality of gears as is known in the art. For example, FIG. 6A shows an apparatus 10' having a drive mechanism 90' mounted on base 40' and including a motor 102, a vertical worm gear 104, a gear 106 engaging worm gear 104, and a horizontal worm gear 108 coaxial with gear 106 and engaging a geared wedge 70'.

Many alternative drive mechanisms may be used consistent with the invention. For example, FIG. 6B shows an alternative apparatus 10" having a drive mechanism 90" mounted on base 40" and including a motor 112, a pulley 114 and a tensioning member 116 joining pulley 114 with wedge 70". Tensioning member may be a belt, a toothed belt, a notched belt, a v-belt, a flat belt, a round belt, a timing belt, a roller chain, or any other member which is capable of transferring a rotation of pulley 114 to wedge 70". To this extent, pulley 114 and wedge 70" may include suitable structure for mating with tensioning member 116, e.g., a roller chain sprocket, a v-type pulley, a toothed pulley, a notched pulley, a flat pulley, a flat pulley with flanged faces, a round grooved pulley, a timing belt pulley, etc. Other drive mechanisms for rotating wedge 70 may also be used in the alternative, e.g., rubber rollers.

As discussed above, the orientation of the support surface may be varied in many manners, e.g., pivoting, displacement, rotation, etc. For example, in apparatus 10, the movement may be of the form of pivoting the support surface about a plurality of axes, specifically as a result of rotating the orthogonal axis of the support surface to describe a conical shape. Portions of the support surface may also be raised or lowered (e.g., through one or more lifting devices attached to one or more corners of the support surface) or displaced laterally. Consistent with these various manners of varying the orientation of the support surface, many different moving mechanisms may be contemplated. Besides the various mechanisms described above, various moving mechanisms such as sprocket, gear and pulley assemblies, including bevel gears, mechanical screws, drive gears, and worm gears; hydraulic, linear, electro-mechanical, mechanical screw, recirculating ball and electro-mechanical linear or rotational actuators; mechanical levers, wedges, cams, ratchet cams; electric, hydraulic, pneumatic or electro-magnetic cylinders; air springs; winches; or other electrical, mechanical, magnetic, pressure, hydraulic, or other moving mechanisms known in the art.

As also was discussed above, many different support surfaces may be used for different applications or environments. For example, in FIG. 7, apparatus 10 is shown in a keyboard stand environment, with a keyboard 120 supported on support surface 20. This exemplifies a support surface which supports the workpiece to be operated upon. When an operator uses the keyboard, the orientation of the keyboard will change over time, which will vary the positioning of the wrists, hands, and fingers of an operator slightly to thereby reduce the repetitiveness of the motions typically performed when typing.

FIG. 8 shows another application, a wrist pad/support apparatus 10''', where the support surface 20''' instead supports a part of the body (e.g., the wrists or palms) of the operator. The orientation of support surface 20''' may be varied in any of the above-described manners, e.g., through pivoting about a lateral axis (shown by arrows 130 and 132), and/or by pivoting about a longitudinal axis (shown by arrow 134). Alternatively, the height of the pad may be varied, or the pad may take to motion of apparatus 10 shown in FIGS. 1–5. The wrist pad/support may also be used for other user input devices, such as trackballs, mice, keypads, etc., as well as to support other portions of an operator's anatomy.

The invention therefore provides reduction in the likelihood of injury due to the performance of repetitive tasks. As one skilled in the art will appreciate that various modifications and changes may be made to the preferred embodiments without departing from the spirit and scope of the invention, the invention thus lies in the claims hereinafter appended.

What is claimed is:

1. An apparatus for reducing repetitive stress injury, the apparatus comprising:

(a) a support surface from which an operator performs a repetitive task, the support surface having at least one side edge; and (b) moving means for automatically oscillating the support surface relative to the operator in a predetermined manner over time, wherein the at least one side edge remains generally oriented toward the operator while the operator performs a repetitive task;

and further including a base for supporting the support surface, wherein the moving means includes:

(i) a wedge interposed between the base and the support surface, the wedge having first and second surfaces facing the base and the support surface, respectively, the second surface inclined relative to the first surface; and (ii) drive means for rotating the wedge and thereby varying the inclination of the support surface.

2. The apparatus of claim 1, wherein the support surface is pivotable about at least one pivot axis.

3. The apparatus of claim 1, wherein at least a portion of the support surface is raisable and lowerable.

4. The apparatus of claim 1, wherein the wedge is a first wedge, the apparatus further comprising a second wedge, interposed between the first wedge and the support surface, the second wedge having first and second surfaces facing the support surface and the second surface of the first wedge, respectively.

5. The apparatus of claim 4, wherein the first and second surfaces of the second wedge are respectively inclined the same as the first and second surfaces of the first wedge; whereby the support surface is pivotable to a substantially neutral inclination.

6. The apparatus of claim 1, wherein the wedge includes a plurality of teeth disposed about its periphery, and wherein the drive means includes a worm gear threadably engaging the teeth on the wedge, and an electric motor for rotating the worm gear.

7. The apparatus of claim 1, further comprising securing means for securing the support surface to the base, wherein the securing means resists rotation of the support surface relative to the base.

8. The apparatus of claim 7, wherein the securing means includes a flexible boot respectively secured at opposing ends to the base and the support surface.

9. The apparatus of claim 1, wherein the support surface supports a workpiece upon which the operator operates while performing the repetitive task.

10. The apparatus of claim 9, wherein the support surface is adapted to support a keyboard.

11. The apparatus of claim 1, wherein the support surface is adapted to support a part of the operator's body while the operator performs the repetitive task.

12. The apparatus of claim 11, wherein the support surface is a wrist pad for use with a keyboard.

13. The apparatus of claim 1, wherein the support surface is moveable at a rate which is imperceptible to an operator.

14. The apparatus of claim 1, wherein the support surface is continuously moveable.

15. A keyboard support, comprising:

(a) a base;

(b) a first wedge rotatably coupled to the base, the first wedge including a plurality of teeth disposed about its periphery and an inclined surface;

(c) a second wedge rotatably coupled having an inclined surface engaging the inclined surface of the first wedge;

(d) a support surface, coupled to the second wedge and secured to the base by a flexible boot respectively secured to the support surface and the base, the support surface adapted to receive a keyboard; and (e) moving means for rotating the first wedge relative to the second wedge, the moving means including a worm gear engaging the teeth on the first wedge and an electric motor for driving the worm gear.

16. A keyboard support, comprising:

(a) a base;

(b) a support surface that receives a keyboard, the support surface non-rotatably coupled to the base such that rotation of the support surface relative to the base is restricted;

(c) a wedge rotatably coupled to the base to rotate relative to the base and to the support surface, the wedge defining an upwardly facing inclined surface that supports the support surface; and (d) a motor, coupled to the wedge, the motor rotating the wedge to impart a periodic tilting movement to the support surface and thereby automatically vary the spatial relationship between an operator and the keyboard in a predetermined manner over time.

17. An apparatus for reducing repetitive stress injury, the apparatus comprising:

(a) a support surface from which an operator performs a repetitive task;

(b) a base for supporting the support surface;

(c) securing means for securing the support surface to the base, wherein the securing means resists rotation of the support surface relative to the base; and (d) moving means for automatically oscillating the support surface relative to the operator in a predetermined manner over time, and while the operator performs a repetitive task, the moving means including:

(1) a wedge, interposed between the base and the support surface, the wedge having first and second surfaces facing the base and the support surface, respectively, the second surface inclined relative to the first surface; and (2) drive means for rotating the wedge and thereby varying the inclination of the support surface.

18. An apparatus for reducing repetitive stress injury, the apparatus comprising:

(a) a support surface from which an operator performs a repetitive task;

(b) a base non-rotatably coupled to the support surface such that rotation of the support surface relative to the base is restricted;

(c) a wedge interposed between the base and the support surface, the wedge defining first and second surfaces facing the base and the support surface, respectively, the second surface inclined relative to the first surface; and (d) a motor coupled to the wedge to rotate the wedge and thereby vary the inclination of the support surface relative to the operator in a predetermined manner over time.

19. The apparatus of claim 18, wherein the wedge is a first wedge, the apparatus further comprising a second wedge, interposed between the first wedge and the support surface, the second wedge having first and second surfaces facing the support surface and the second surface of the first wedge, respectively.

20. The apparatus of claim 18, further comprising a flexible boot respectively secured at opposing ends to the base and the support surface.

21. The apparatus of claim 18, wherein the support surface is configured to support a keyboard.

* * * * *